(12) United States Patent
Bourbonnais et al.

(10) Patent No.: US 9,600,513 B2
(45) Date of Patent: Mar. 21, 2017

(54) DATABASE TABLE COMPARISON

(75) Inventors: Serge Bourbonnais, Palo Alto, CA (US); Marcel Kutsch, San Jose, CA (US); Xiao Li, San Jose, CA (US); Jonathan Wierenga, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 745 days.

(21) Appl. No.: 13/156,629

(22) Filed: Jun. 9, 2011

(65) Prior Publication Data
US 2012/0317134 A1 Dec. 13, 2012

(51) Int. Cl.
G06F 7/00 (2006.01)
G06F 17/30 (2006.01)

(52) U.S. Cl.
CPC .............. *G06F 17/30371* (2013.01)

(58) Field of Classification Search
CPC .............. G06F 17/30; G06F 17/30371; G06F 17/30536; G06F 17/30528; G06F 17/30557; G06F 17/30578; G06F 17/30575
See application file for complete search history.

(56) References Cited

U.S. PATENT DOCUMENTS

| | | | |
|---|---|---|---|
| 3,964,029 A | 6/1976 | Babb | |
| 4,290,115 A | 9/1981 | Pitt et al. | |
| 4,382,277 A | 5/1983 | Glaser et al. | |
| 4,422,158 A | 12/1983 | Galie | |
| 4,495,566 A | 1/1985 | Dickinson et al. | |
| 4,771,427 A | 9/1988 | Tulpule et al. | |
| 4,849,978 A | 7/1989 | Dishon et al. | |
| 5,111,395 A | 5/1992 | Smith et al. | |
| 5,121,494 A | 6/1992 | Dias et al. | |
| 5,189,709 A | 2/1993 | Wang et al. | |
| 5,193,185 A | 3/1993 | Lanter | |
| 5,202,982 A | 4/1993 | Gramlich et al. | |
| 5,241,648 A | 8/1993 | Cheng et al. | |
| 5,261,092 A | 11/1993 | McLaughlin et al. | |

(Continued)

FOREIGN PATENT DOCUMENTS

| | | |
|---|---|---|
| GB | 2297180 A | 7/1996 |
| JP | 3152640 | 6/1991 |

(Continued)

OTHER PUBLICATIONS

Performance of Database Synchronization Algorithms Via Satellite Chen Tang, Anton Donner, Javier Mulero Chaves, Muhammad Muhammad Sep. 15, 2010.*

(Continued)

*Primary Examiner* — Azam Cheema
(74) *Attorney, Agent, or Firm* — Patterson + Sheridan, LLP

(57) ABSTRACT

Techniques are disclosed for comparing database tables. In one embodiment, the database tables are partitioned. Queries are generated for retrieving each partition. For each generated query, a stored procedure is invoked, using the respective generated query as an input parameter to the stored procedure. The stored procedure is configured to generate a checksum based on the partition retrieved from executing the respective query. The application compares the generated checksums to determine if the partitions and/or tables are consistent.

20 Claims, 4 Drawing Sheets

(56) References Cited

U.S. PATENT DOCUMENTS

| | | | |
|---|---|---|---|
| 5,261,093 | A | 11/1993 | Asmuth |
| 5,278,978 | A | 1/1994 | Demers et al. |
| 5,317,708 | A | 5/1994 | Edgar |
| 5,386,523 | A | 1/1995 | Crook et al. |
| 5,479,654 | A | 12/1995 | Squibb |
| 5,495,608 | A | 2/1996 | Antoshenkov |
| 5,537,589 | A | 7/1996 | Dalal |
| 5,539,902 | A | 7/1996 | Sakai et al. |
| 5,613,002 | A | 3/1997 | Kephart et al. |
| 5,649,089 | A * | 7/1997 | Kilner ............................ 714/6.3 |
| 5,765,172 | A | 6/1998 | Fox |
| 5,819,268 | A | 10/1998 | Hackett |
| 5,974,574 | A * | 10/1999 | Lennie et al. ................. 714/52 |
| 6,014,676 | A | 1/2000 | McClain |
| 6,029,178 | A * | 2/2000 | Martin et al. |
| 6,101,507 | A | 8/2000 | Cane et al. |
| 6,219,818 | B1 | 4/2001 | Freivald et al. |
| 6,233,589 | B1 | 5/2001 | Balcha et al. |
| 6,393,438 | B1 | 5/2002 | Kathrow et al. |
| 6,529,917 | B1 | 3/2003 | Zoltan |
| 6,553,388 | B1 | 4/2003 | Perks |
| 6,931,390 | B1 * | 8/2005 | Zait et al. |
| 7,054,891 | B2 | 5/2006 | Cole |
| 7,788,225 | B2 | 8/2010 | Fish et al. |
| 7,890,758 | B2 * | 2/2011 | Dettinger et al. ............ 713/171 |
| 8,042,000 | B2 * | 10/2011 | Birch et al. ..................... 714/32 |
| 8,671,074 | B2 * | 3/2014 | Wang et al. ................. 707/634 |
| 2003/0105732 | A1* | 6/2003 | Kagalwala et al. .............. 707/1 |
| 2005/0131893 | A1* | 6/2005 | Von Glan .......................... 707/5 |
| 2006/0212465 | A1 | 9/2006 | Fish et al. |
| 2010/0094802 | A1 | 4/2010 | Luotojarvi et al. |
| 2010/0114831 | A1 | 5/2010 | Gilbert et al. |
| 2010/0228706 | A1* | 9/2010 | Labuda ........................ 707/700 |

FOREIGN PATENT DOCUMENTS

| | | |
|---|---|---|
| WO | 97/45786 | 12/1997 |
| WO | 2007117132 A1 | 10/2007 |

OTHER PUBLICATIONS

"mk-table-sync—Scnchronize MySQL table data efficiently" http://www.maatkit.org/doc/mk-table-sync.html As indexed by archive.org on Sep. 7, 2009.*

Thread (Computing) Wikipedia.org As taken from Wikipedia archives May 31, 2010.*

"Sort vs. Hash Revisited" Goetz Graefe. Ann Linville, and Leonard D. Shapiro Dec. 1994.*

Mutalik et al. (WO 03/003209).*

Hernandez, Mauricio A. et al., The Merge/Purge Problem for Large Databases, Proceedings of the 1995 ACM SIGMOD international conference on Management of data, May 1995, pp. 127-138, vol. 24, Issue 2, ACM, New York, New York, United States.

IBM, asntdiff:Comparing data in source and target tables (Linux, UNIX, Windows), IBM DB2 pureScale Feature Information Center, Sep. 23, 2010, <http://publib.boulder.ibm.com/infocenter/db2luw/v9r8/index.jsp?topic=/com.ibm.swg.im.iis.db.repl.utilities.doc/topics/iiyrctdfrasntdif.html>.

Coelho, Fabien, Remote Comparison of Databes Tables Technical Report A/375/CRI, The Third International Conference on Advances in Databases, Knowledge, and Data Applications, Jan. 23, 2011, pp. 23-28, IARIA, St. Maarten, The Netherlands Antilles.

IBM, System for Detecting Undesired Alteration of Software, IBM Technical Disclosure Bulletin, Apr. 1998, pp. 48-50, vol. 32, No. 11, IBM, Armonk, New York, United States.

Perrizo, William et al., Domain Vector Accelerator (DVA): A Query Accelerator for Relational Operations; Seventh International Conference on Data Engineering, 1991, pp. 491-498, IEEE Computer Society, Washington, D.C., United States.

Wegman M., Set Equality Testing Technique, IBM Technical Disclosure, Aug. 1978, pp. 1314-1315, vol. 21, No. 3, IBM, Armonk, New York, United States.

Batiste, R.D., Method to Provide Software Calculation of 32-Bit Frame Check Sequence, A Byte at a Time, May 1988, pp. 458-464, vol. 30., No. 12, IBM, Armonk, New York. United States.

* cited by examiner

DATABASE TABLE COMPARISON

BACKGROUND

Databases are computerized information storage and retrieval systems. The most prevalent type of database is the relational database, a tabular database in which data is defined so that it can be reorganized and accessed in a number of different ways.

Regardless of the particular architecture, in a database management system (DBMS), a requesting entity, such as an application, demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that allows programmers and programs to select, insert, and/or update the data,

SUMMARY

Embodiments of the invention provide a computer-implemented method, computer program product and system for performing an operation that includes identifying a key range for a partition of at least one database table of a plurality of database tables comprising a first database table and a second database table. The operation also includes generating, for each database table and based on the key range identified for the partition, a database query for retrieving the partition from the respective database table. The operation also includes invoking, for each database table, a stored procedure using the database query generated for the respective database table as an input parameter to the stored procedure, where the stored procedure is configured to compute a checksum based on the partition in the respective database table. The operation also includes determining whether the partition is consistent across the first and second database tables, based on a comparison between the checksum computed from the partition in the first database table and the checksum computed from the partition in the second database table.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
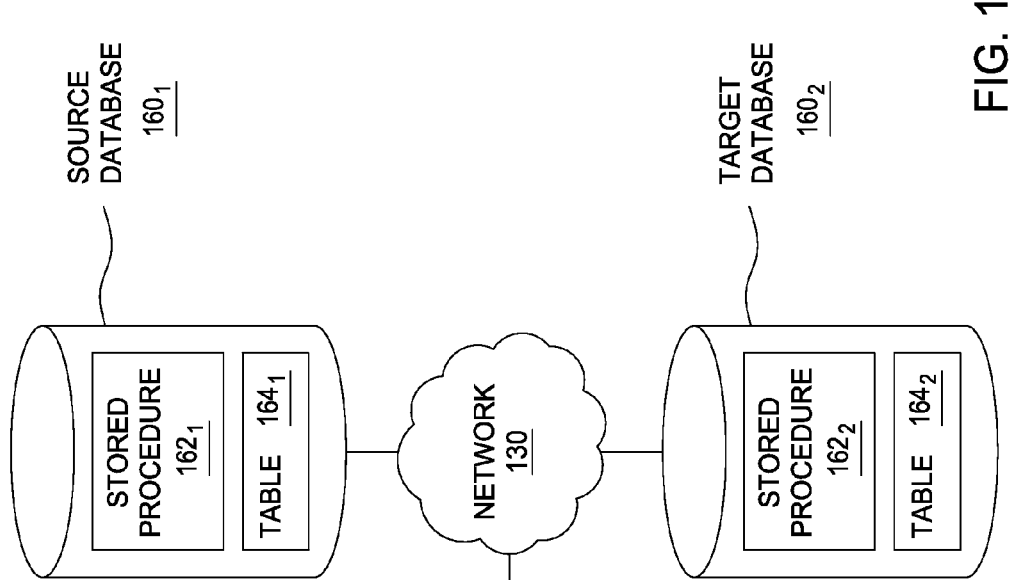
FIG. 1 is a block diagram illustrating a system for comparing database tables, according to one embodiment of the invention.
Figure 1:
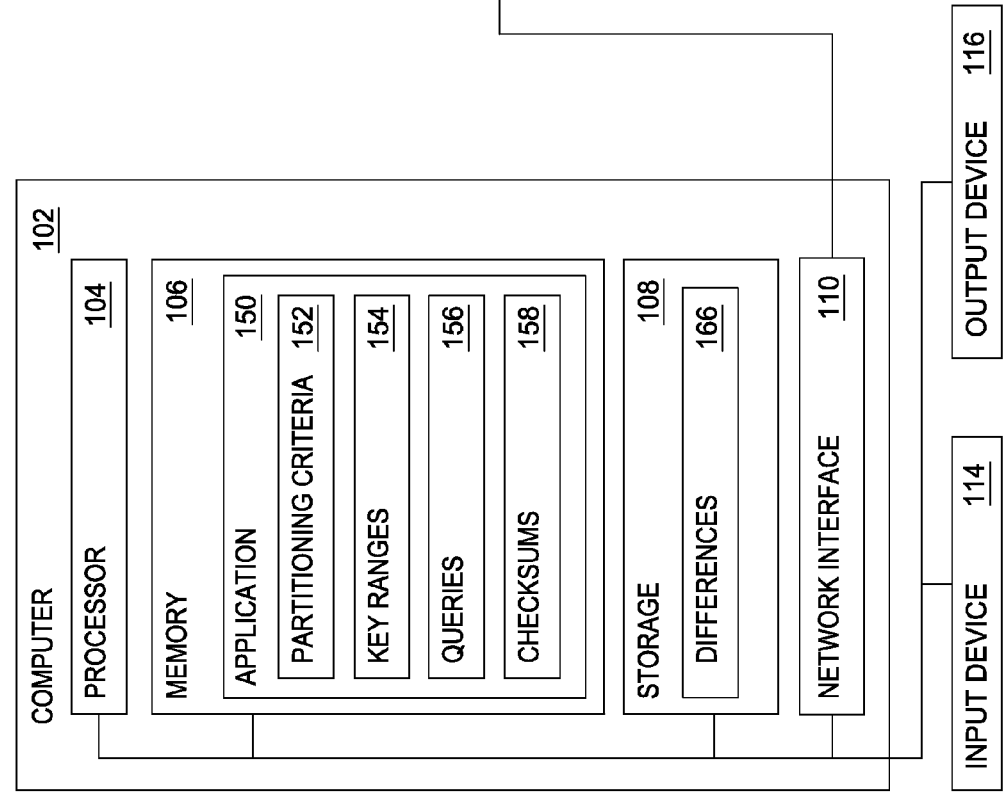

Embodiments of the invention provide techniques for comparing database tables. One embodiment provides an application that receives a user request to compare the database tables. In some embodiments, the database tables include a first table stored in a first database and a second table stored in a second database, where the first and second databases are operatively connected over the network. Further, a relationship may be maintained between the two tables, the relationship specifying that data in the first table is replicated to the second table. In this regard, the first table may also be referred to as a source replicated table, and the second table may be referred to as a target replicated table. In some embodiments, data in the second table is also replicated back to the first table. The application is configured to communicate with a database management system (DBMS) associated with each of the first and second databases. The communication may occur by way of one or more application programming interfaces (APIs) provided by each DBMS. In other embodiments, however, the database tables may both be stored in a single database, and the application communicates with a single DBMS configured to manage the single database. Additionally or alternatively, in other embodiments, some or all of the functionality of the application may be performed by the DBMS.

In one embodiment, the application divides the first and second tables into partitions based on predefined partitioning criteria. The predefined partitioning criteria may be user-specified. The application then identifies a range of rows for each partition of the source table. For a unique key that includes only a single column of the table, each range of rows is identified based on a minimum and maximum boundary key value. For a key that includes multiple columns, each range of rows is identified based on a minimum and maximum tuple of key values. In some embodiments, the first range of rows need not necessarily be identified by any minimum key value, and/or the last range of rows need not necessarily be identified by any maximum key value. The minimum boundary key value refers to a minimum value stored in a specified key column of the partition. The maximum boundary key value refers to a maximum value stored in the specified key column of the partition. The application then generates a query for retrieving each partition, where the rows of the respective partition are ordered by the unique key. The generated query may be used to retrieve a given partition from the first and second database tables, respectively, the given partition being characterized by the same boundary key values identified by the application. In some embodiments, to achieve parallelism, query generation may be conducted by respective threads of the application.

In one embodiment, for each partition, the application invokes a stored procedure on each database, passing the generated query for the respective partition as an input parameter to the stored procedure. A stored procedure refers to an application that is executable by and stored in a DBMS.

To achieve increased parallelism, the following techniques may be used separately or in combination. A first technique includes invoking, within a stored procedure, other stored procedures in the DBMS. A second technique includes creating, in a given stored procedure, multiple processes and/or threads to execute sub-routines in parallel, where the sub-routines may be identical or different. A third technique involves creating multiple threads by the application, each of which calls the same stored procedure in the DBMS. For each call, DBMS creates an instance of the stored procedure being executed. Accordingly, each database may include multiple instances of the stored procedure executing in parallel.

In one embodiment, the stored procedure invoked by the application is configured to perform one or more predefined operations to determine a partition checksum based on all rows of the respective partition. Determining the partition checksum is further described below. The partition checksum may also be referred to herein as a checksum. As described above, to achieve parallelism, each stored procedure may be invoked by a respective thread of the application, and/or each stored procedure may invoke additional threads for performing checksum computation. Depending on the embodiment, the stored procedure may be provided by or with the application or DBMS. At least in some embodiments, the predefined operations are more data-intensive than operations performed by the application. Accordingly, by implementing the predefined operations as a stored procedure rather than in the application, data may be accessed locally by the stored procedure, which executes in the DBMS that manages the database storing the data. In other words, requests for data and responses containing data do not need to be sent over the network. Accordingly, the predefined operations may be performed more efficiently at least in some cases. Further, security may be improved because the application may be assigned fewer privileges than the stored procedures and/or less potentially sensitive data is exposed over the network.

In one embodiment, for a specific partition, the application determines whether the checksum computed by the stored procedure in the first database matches the checksum computed by the stored procedure in the second database. In some embodiments, to achieve parallelism, the determination may be made by the respective thread that previously invoked the stored procedure. Matching checksums indicate that the partitions are likely consistent with one another, while differing checksums indicate that the partitions are likely not consistent with one another. If the checksum of each partition of the first table matches the checksum of the corresponding partition of the second table, then the application may determine that the tables are consistent with one another. On the other hand, if the checksum of any partition of the first table does not match the checksum of the corresponding partition of the second table, then the application may determine that the tables are not consistent with one another. In some embodiments, the application may also determine which specific rows of the tables do not match, by comparing row checksums and/or row key values. The application may notify a user of the specific rows that do not match. In some embodiments, the application also provides a user-selectable option to modify the second table such that the second table matches the first table. If the option is selected, then the application also performs one or more inserts, updates, and/or deletes on the second table, such that the second table matches the first table.

Advantageously, the techniques disclosed herein may be used to compare database tables more conveniently, efficiently, and/or scalably at least in some cases, whether the database tables are stored in a single database or across multiple databases. The disclosed techniques may be particularly suited to database tables exceeding a predefined threshold storage size or row count and/or database tables stored in databases that are geographically distant from one another, beyond a predefined threshold distance. Such database tables are increasingly common today, given the exponential growth of data, the advent of business globalization, and the increasing use of data centers, which may often be located across large geographical distances for purposes of high availability, disaster recovery and/or scalability. For geographically distant databases connected via a network having limited bandwidth and/or high latency characteristics, the techniques disclosed herein may allow tables to be compared more efficiently by an order of magnitude in some cases, relative to alternative techniques.

Additionally or alternatively, the disclosed techniques may be particularly suited to database tables having certain properties, such as having less than a predefined threshold count of different rows, sharing common character encoding schemes, collating sequences, and/or endianness, having columns with compatible data types, having a key for a subset of columns common between the database tables, and/or having a date, time, or timestamp column. To the extent that certain operations of the application are performed in parallel, the execution time of the application may be reduced at least in some cases. By comparing tables based on partition checksums, row checksums, and/or key values, the network traffic generated by the application may be reduced at least in some cases, compared with other techniques that include considering additional row values to compare the tables. Further, the execution time of and/or network traffic generated by the application may also be reduced to the extent that certain data-intensive operations, such as checksum computation, are delegated to stored procedures on the database.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a DBMS may execute in the cloud, the DBMS being configured to manage one or more databases. Having the DBMS in the cloud allows the user to access the databases from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for comparing database tables, according to one embodiment of the invention. The networked system 100 includes a computer 102 connected to a source database $160_1$ and a target database $160_2$ over a network 130. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. (Note: Linux is a trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes an application 150. The source and target databases $160_1$, $160_2$ each include a stored procedure 162 and a table 164. The table 164 may be replicated from the source database $160_1$ to the target database $160_2$. The table $164_1$ at the source database $160_1$ may be referred to as a source table, and the table $164_2$ at the target database $160_2$ may be referred to as a target table. The table 164 may be replicated to achieve high availability, scalability, disaster recovery, etc. One example use case scenario involves replicating data from an online transaction processing (OLTP) database to a reporting database. Accordingly, applications may query the reporting database without incurring any additional processing overhead or contending for database locks at the OLTP database, which is reserved for transaction processing. In some embodiments, the reporting database may also be configured to handle the transaction processing for the OLTP database in an event that the OLTP database fails or is taken down by an outage or for maintenance.

In some situations, however, the table 164 may become inconsistent or desynchronized across the databases. For example, an error may occur during a database operation or a replication operation. Alternatively, the table 164 at one of the databases may have been tampered with by an application or a user, either intentionally or unintentionally. Accordingly, in one embodiment, the application 150 is configured to determine, responsive to a request, whether the table $164_1$ in the source database $160_1$ is consistent with the table $164_2$ in the target database $160_2$. In doing so, the application 150 may communicate with a database management system (DBMS) associated with each database 160 to carry out the operations described below.

In one embodiment, to determine whether the table $164_1$ is consistent with the table $164_2$, the application performs the following operations. The application 150 partitions each table 164 based on partitioning criteria 152. The application 150 may then determine a key range 154 for the each partition. For each partition, the application 150 then generates a query 156 for retrieving the respective partition. The query 156 may be generated based on the key ranges 154. For each query 156, the application may then invoke a stored procedure 162 on each database 160, passing the respective query 156 as an input parameter to the stored procedure 162. The stored procedure 162 is configured to determine a checksum 158 for the partition retrieved by the respective query 156. The stored procedure 162 then returns the checksum 158 to the application 150.

In one embodiment, for a given partition, if the checksums 158 match, then the application 150 may determine that the given partition is consistent across the databases 160. At least in some embodiments, that the given partition is consistent across the databases 160 is merely determined to a certain statistical probability. The statistical probability may vary depending on the checksum algorithm used to compute the checksums 158. In one embodiment, if the given partition is determined not to be consistent, then the application 150 may determine that the given partition is not consistent across the databases 160 and proceed to determine which specific rows of the tables do not match, by comparing row checksums and/or row key values. In some embodiments, the determination of specific rows that do not match is performed by the application 150. In other embodiments, the determination is performed by another stored procedure invoked by the application 150.

In one embodiment, if the checksums 158 match for all partitions, then the application 150 may determine that the tables are consistent across the databases 160. Otherwise, the application 150 may determine that the tables are not consistent across the databases 160. The application 150 may notify a user of whether the tables are determined to be consistent. In some embodiments, the application 150 may provide a user-selectable option to render the table $164_2$ in the target database $160_2$ consistent with the table $164_1$ source database $160_1$. If the option is selected, the application 150 may issue one or more commands to the target database $160_2$ to modify the table $164_2$ in accordance with the table $164_1$. The commands may be expressed in a Data Manipulation Language (DML) and may include inserts, updates, and/or deletes. Advantageously, the application 150 may be used to identify inconsistent rows of the table 164 and/or bring the table 164 to a consistent state across the databases 160. The differences between the inconsistent rows may be stored in the storage 108 as differences 166. Alternatively, the differences 166 may be stored on the source database 160$_1$ and/or the target database 160$_2$. The differences may subsequently be retrieved based on user input.

In some embodiments, some or all of the functionality of the application may be performed on the source and/or target databases 160$_{1-2}$ rather than on the computer 102. In some embodiments, the application itself may execute on the source and/or target databases 160$_{1-2}$. In other embodiments, some or all of the functionality of the application may be performed by the DBMS of the source and/or target databases 160$_{1-2}$. At least in some cases, executing the functionality on the source and/or target databases 160$_{1-2}$ may be more efficient than executing the functionality on a remote computer such as the computer 102. Further, storing the differences on the source and/or target databases 160$_{1-2}$ may result in reduced network traffic and/or latency, relative to storing the differences on the remote computer. In one embodiment, where execution occurs and/or where the differences are stored may be tailored to suit the needs of an individual case.

Figure 2:
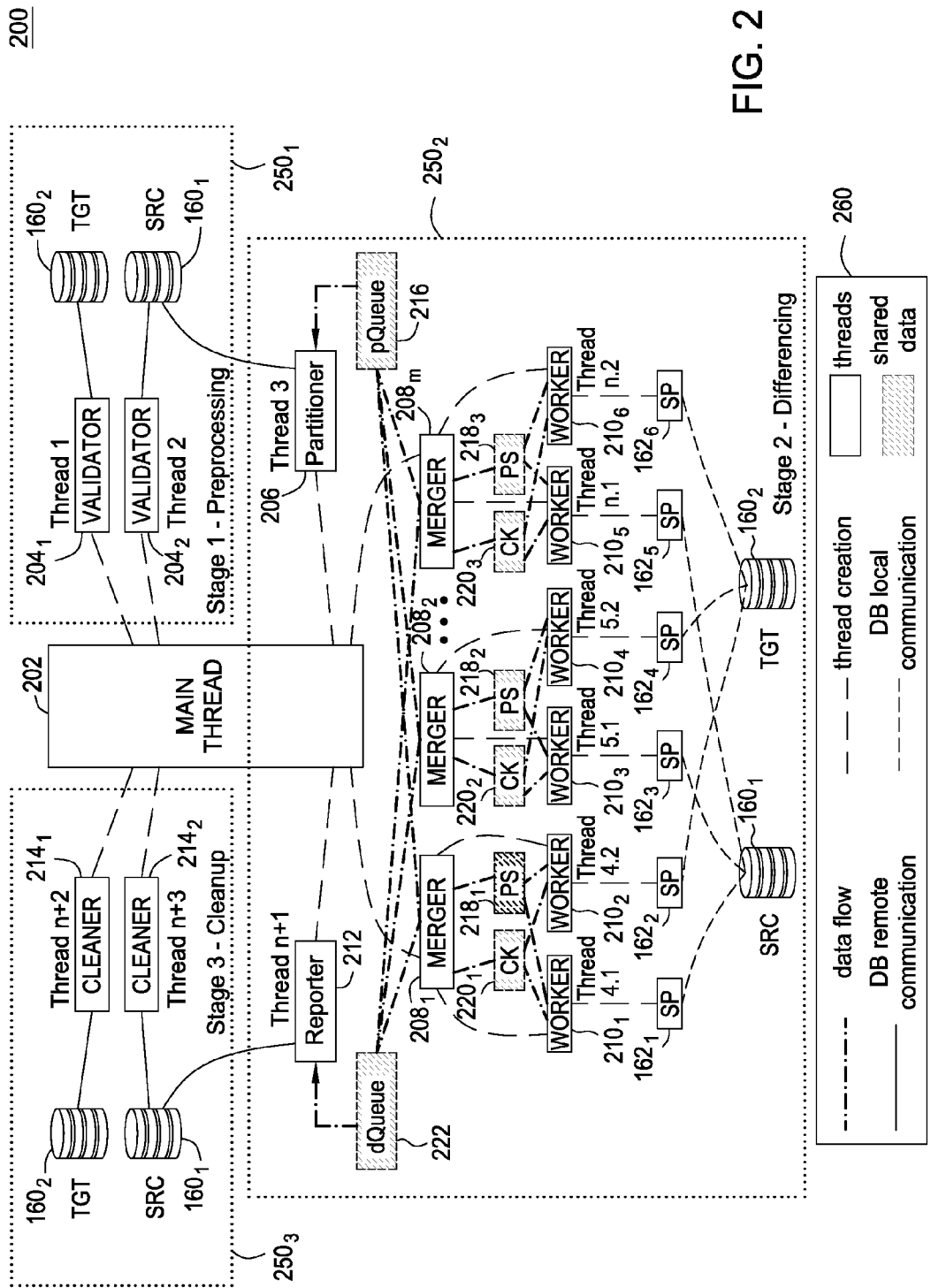
FIG. 2 is a block diagram illustrating components of an application for comparing database tables, according to one embodiment of the invention.

FIG. 2 is a block diagram illustrating components 200 of the application 150 of FIG. 1, according to one embodiment of the invention. As shown, the components 200 include a main thread 202 of the application 150. The main thread 202 spawns one or more child threads for determining whether the table 164 is consistent across the databases 160. The child threads include a validator thread 204 for each database 160, a partitioner thread, merger threads 208, a reporter thread 212, and a cleaner thread 214 for each database 160. Each merger thread 208 may spawn one or more worker threads 210. To better illustrate embodiments of the invention, the operations involved in determining whether the table 164 is consistent may be classified into three stages 250. The three stages 250 including a preprocessing stage 250$_1$, a differencing stage 250$_2$, and a cleanup stage 250$_3$.

In one embodiment, in the preprocessing stage 250$_1$, the application 150 verifies whether a number of predetermined conditions (or preconditions) are met. The predetermined conditions include a condition specifying that the tables 164$_1$ and 164$_2$ have identical or compatible column data types and column sizes, for at least a subset of the columns. In other words, column names and column count of the tables 164$_1$, 164$_2$ need not necessarily match. In cases where the database replication allows schema mapping, instances of a replicated table may have data types and/or sizes that are not necessarily identical but that are compatible. In such cases, the application 150 may use type casting to convert between the data types and/or sizes. The type casting may be performed using predefined expressions in a query language supported by the DBMS.

In one embodiment, the predetermined conditions also include a condition specifying that the tables 164$_1$ and 164$_2$ are associated with the same character encoding scheme, collating sequence, and endianness. A character encoding scheme, also referred to as a code page, specifies a mapping between distinct characters being represented to distinct numeric values that are internally stored. The numeric values may also be referred to as code points. A collating sequence refers to a predefined order of distinct characters that is used to sort a collection of character strings having instances of the characters. Endianness, or byte order, specifies whether the least-significant byte or the most-significant byte is stored first. The predetermined conditions also include a condition specifying that the tables 164$_1$ and 164$_2$ use identical unique constraints. Unique constraints ensure that every value in a specified key is unique.

In one embodiment, if all of the predetermined conditions are met, then the application 150 determines the partition criteria 152 for use in partitioning the tables 164$_1$ and 164$_2$. In one embodiment, the partition criteria 152 include a partition size. The partition size may be determined based on an amount of free memory on the computer 102. Alternatively, the partition size may be predefined by a user of the application 150. A partition size of sixty-four megabytes (64 MB) has shown to be useful in at least some cases. Then application 150 may then determine a count of partitions to be created from each table 164. The count of partitions may be given by the following equation:

$$\text{Number\_Partitions} = (\text{Total\_Row\_Number} * \text{Row\_Size}) / \text{Partition\_Size}.$$

In the above equation, Number_Partitions represents the count of partitions to be created in each table. Total_Row_Number represents a row count of the source table 164$_1$ or the target table 164$_2$, whichever is smaller in size. Row_Size represents an estimated row size of the source table 164$_1$ or the target table 164$_2$, whichever is smaller in size. The row size estimate is retrieved for the respective table, from a system catalog of the DBMS. Partition_Size represents the partition size. Using the above equation, the count of partitions is set to the row count multiplied by row size and divided by the partition size.

In one embodiment, the application 150 may then determine a count of threads to spawn, based on the determined count of partitions. Each thread is configured to process a respective partition, in parallel with other threads. The count of threads may be given by the following equation:

$$\text{Number\_Threads} = \text{Min}(\text{Number\_Partitions}, \text{Max\_Threads})$$

In the above equation, Number_Threads represents the count of threads to spawn. Number_Partitions represents the determined count of partitions. Max_Threads represents a user-specified maximum number of threads to spawn. For example, a user may specify the maximum number of threads to conserve resources of the computer 102 for executing other applications. Using the above equation, the count of threads to spawn is set to the smaller of the count of partitions and the maximum number of threads to spawn. Depending on the embodiment, the operations of the application 150 during the preprocessing stage 250$_1$ may be performed by the main thread 202 and/or the validating threads 204.

In one embodiment, in the differencing stage 250$_2$, the application 150 partitions the tables 164$_1$, 164$_2$, identifies differences between the tables 164$_1$, 164$_2$, and notifies a user of the identified differences. At least in some embodiments, the partitions are created in the application 150 and are not reflected at all in the databases and are independent from any existing partitions in the database. Put another way, partitioning the tables does not necessarily involve altering the tables stored in the databases in any way. For instance, partitioning the tables does not necessarily involve issuing database commands to the DBMS to create database partitions or table partitions. Instead, partitioning the tables refers to generating partition information by the application, the partition information being resident in the memory 106 of the computer 102. In some embodiments, the partition information may also be stored in the storage 108. The partition information is subsequently used by the application 150 for generating the queries 156 to retrieve subsets of table data, the subsets being regarded by the application 150 as "partitions".

To better illustrate embodiments of the invention, the operations performed by the application 150 in differencing stage $250_2$ may be classified into three sub-stages. The three sub-stages include a partitioning sub-stage, a discovery sub-stage, and a reporting sub-stage. In the partitioning sub-stage, the partitioner thread 206 determines boundary key values for each partition from the source table $164_1$. The boundary key values for each partition specify the key range 164 for the respective partition. The boundary key values include a minimum key value in the respective partition and a maximum key value in the respective partition. In one embodiment, the boundary key values are determined via a single index scan of the source table $164_1$. Alternatively, the boundary key values are extracted from a database catalog table, without performing any index scan of the source table $164_1$. Alternatively, partitions are defined by boundary key values that are extracted from sampling the table at a page-level rather than scanning the whole table. For example, the boundary key values may be extracted from the database catalog table for Partition by Range (PBR) table spaces. At least in some embodiments, the boundary key values determined from the source table $164_1$ also apply to the target table $164_2$. Accordingly, the partitioner thread 206 need not necessarily access the target table $164_2$ for determining the boundary key values, resulting in reduced processing and/or network traffic.

In one embodiment, for each partition, the partitioner thread 206 uses the boundary key values for the respective partition to generate the queries 156 for retrieving the respective partition from the source table $164_1$ and the target table $164_2$, respectively. At least in some embodiments, a respective query is generated for retrieving each partition from each table 164. Each generated query may be stored in a list referred to as a partitioning queue or "pQueue" 216 for use in the discovery sub-stage. As used herein, a query may also be referred to as a query statement or statement.

In one embodiment, in the discovery sub-stage, the main thread 202 of the application 150 spawns a pool of merger threads 208 based on the count of threads to spawn, Number_Threads. Each merger thread 208 spawns two worker threads 210. The two worker threads 210 include a respective worker thread for each table 160. The first worker thread of each merger thread 208 connects to the source database $160_1$, and the second worker thread of each merger thread 208 connects to the target database $160_2$. Each merger thread 208 then retrieves and removes, from the partitioning queue 216, the query 156 for a respective partition to be evaluated. Each merger thread 208 then assigns the query 156 to its worker threads via a partitioning statement queue or "PSQueue" 218 associated with the respective merger thread 208. Each worker thread then invokes a stored procedure 162 on the source database $160_1$ or target database $160_2$, depending on the respective worker thread. When invoking the stored procedure 162, the respective worker thread passes the query 156 as an input parameter to the stored procedure 162.

In one embodiment, when invoked, the stored procedure 162 retrieves all rows of a given partition using multi-row fetches based on the received query 156, where the rows of the given partition are sorted based on a unique key. The stored procedure 162 then computes a row checksum for each retrieved row. The stored procedure 162 may store, in a temporary table associated with the calling worker thread, the row checksums and key values in the retrieved rows. At least in some embodiments, the temporary table may be a non-logged table.

In one embodiment, the stored procedure may then compute a partition checksum for the given partition, using the row checksums for all rows of the given partition. The partition checksum may be computed recursively using a checksum aggregation function, as given by the following pseudocode:

Chk_agg3(Chk_agg2(Chk(row1), Chk(row2)), Chk (row3));

In the above pseudocode, Chk_agg3 and Chk_agg2 represent calls to the checksum aggregation function. Chk represents calls to the checksum algorithm. row1, row2, and row3 represent rows retrieved from the table 164.

In one embodiment, the partition checksum may also be computed using an alternative approach. In the alternative approach, the stored procedure performs m multi-row fetches. For example, if each fetch retrieves five hundred rows and the stored procedure is operating on a partition having ten thousand rows, then the stored procedure would perform twenty multi-row fetches. In the first multi-row fetch, the stored procedure calculates a row checksum for each row to generate a set of row checksums given by {rc_1, rc_2, . . . , rc_n}. The row checksums may be stored in an array to subsequently be used for multi-row insertions into the temporary table. Further, treating the row checksums are treated as a single, continuous character string, the stored procedure may generate a checksum from the continuous character string. The generated checksum may be referred to as the multi-row checksum.

For each multi-row fetch subsequent to the first multi-row fetch, the stored procedure may use recursive aggregation to generate a multi-row checksum for the respective, subsequent multi-row fetch. For example, the stored procedure may compute the multi-row checksum of a multi-row fetch between row 1 through row 3N in the partition, according to the following pseudocode:

Chk_agg( Chk_agg (Chk_agg(InitialCRC,
    Concat(Chk(row1), ..., Chk(rowN)) ),
    Concat( Chk(rowN+1), ..., Chk(row2N)) ),
    Concat (Chk(row2N+1), ..., Chk(row3N)) );

In the above pseudocode, Check_agg represents calls to the checksum aggregation function. Initial CRC represents the multi-row checksum computed for the preceding multi-row fetch. Concat represents calls to a concatenation function. Chk represents calls to the checksum algorithm. row1, rowN, rowN+1, row2N, row2N+1, and row3N represent the ordered rows retrieved from the table 164 via the current multi-row fetch. A partition checksum is computed when all rows in the partition are processed according to the above pseudocode. For example, if the partition only includes 3N rows, then the resulting value computed by the stored procedure according to the above pseudocode is the partition checksum. The stored procedure may then return the partition checksum to the worker thread 210 calling the stored procedure.

In one embodiment, the row checksum, the multi-row checksum, and the partition checksum may each be of any predefined length. In a particular embodiment, the row checksum is four bytes long, the multi-row checksum is eight bytes long, and the partition checksum is eight bytes long. Further, the row checksums and partition checksums may be computed using any predefined checksum algorithm. Examples of checksum algorithms include Fletcher's checksum, Adler-32 and cyclic redundancy checks (CRCs). Using a CRC algorithm to compute the checksums and/or composite checksums may reduce collision probabilities at least in some cases. A collision occurs when an identical checksum is generated from two distinct input values, respectively. At least in some embodiments, the odds of a collision under a CRC algorithm may be less than one in four billion.

In one embodiment, if, for a given a given partition, the partition checksum from the target table $164_2$ matches the partition checksum from the source table $164_1$, then the merger thread 208 determines that the given partition is consistent across the databases 160 and proceeds to process a next partition by retrieving a next query 156 from the partitioning queue 216. Otherwise, the merger thread 208 queues a merge request to its worker threads 210. In response to the merge request, each worker thread 210 fetches keys and corresponding row checksums from the temporary table associated with the respective worker thread 210. The worker threads 210 then pass the fetched keys and row checksums to the respective merger thread 208. The keys and row checksums may be sorted by key order and passed via checksum queues or "CKQueues" 220 associated with the merger threads 208. Each merger thread 208 then joins the result sets by key values to identify differences on a row-by-row basis. Each merger thread 208 sends each identified difference to the reporter thread 212 via a difference reporting queue or "dQueue" 222 associated with the reporter thread 212. The discovery sub-stage is complete after the differences are identified.

In one embodiment, in the reporting sub-stage, the reporter thread 212 retrieves all the identified differences from the difference reporting queue 222. The reporter thread 212 then inserts a respective key value and a proposed action into a differencing table associated with the reporter thread 212. The proposed action refers to a command for resolving the identified difference and may include inserts, updates, and/or deletes. To bring the target database $160_2$ into a state consistent with the source database $160_1$, the application 150 may retrieve the commands from the differencing table and issue each command against the DBMS of the target database $160_2$.

In one embodiment, after completing the differencing stage $250_2$, the application 150 proceeds to the cleanup stage $250_3$. In the cleanup stage $250_3$, each cleaner thread 214 performs one or more cleanup operations on the respective databases 160. The cleanup operations may include deleting, from each database 160, the temporary tables associated with the worker threads 210.

In one embodiment, the application 150 may determine whether the source table $164_1$ is consistent with the target table $164_2$, even when the source table $164_1$ and/or the target table $164_2$ are being modified by one or more other applications, and without impacting the other applications. To this end, when extracting data from the databases 160, the application 150 opens a cursor with uncommitted read isolation level. However, the differences identified by the application 150 in such scenarios may not necessarily reflect the latest modifications to the tables 164.

In one embodiment, to identify differences that reflect the latest modifications to the tables 164, all applications issuing transactions against the source table $164_1$ are first suspended before the application 150 performs the consistency determination. For configurations in which both tables $164_1$, $164_2$ are allowed to accept updates, all applications issuing transactions against the target table $164_2$ are also suspended and all in-flight transactions are first allowed to replicate at the source table $164_1$, before application 150 performs the consistency determination. Further, because processed but uncommitted transactions may appear in query results obtained from the source table 164 and/or target table, the suspended applications are to remain suspended for the duration of the consistency determination. Otherwise, the consistency determination may include false positives and/or false negatives.

In some cases, however, it may be unacceptable to suspend certain applications for a prolonged period of time. Accordingly, if the table 164 includes a date, time, or timestamp column, the application 150 may be configured to limit the range of rows to compare, as specified by a user. For instance, the table 164 may include a timestamp column indicating when a row was last modified. The application 150 may use the timestamp column for setting, based on user input, a lower bound and an upper bound of a range of rows to compare. On the other hand, if the table 164 does not include any date or time column, the application 150 may perform two consecutive consistency determinations and compare the results of the consistency determinations. If replicated updates are suspected be occurring at the table 164, then the second consistency determination may be performed after a replication latency window has elapsed. The application 150 may select, as output, the identified differences that are common to both consistency determinations. The output reflects the actual differences between the tables $164_1$, $164_2$, to the exclusion of any false positives or negatives resulting from the replicated updates.

As described above, one of the preconditions for performing consistency determination is the condition that the tables $164_1$ and $164_2$ are associated with the same character encoding scheme, collating sequence, and endianness. Nevertheless, in some embodiments, even if the tables $164_1$ and $164_2$ are associated with different character encoding schemes, collating sequences, and/or endianness, the application 150 may consider the precondition to be satisfied after performing one or more conversion operations. For example, in the collating sequence associated with Extended Binary Coded Decimal Interchange Code (EBCDIC), the uppercase letter 'A' comes after the lowercase letter 'a'. In contrast, in the collating sequence associated with American Standard Code for Information Interchange (ASCII), the uppercase letter 'A' comes before the lowercase letter 'a'.

In one embodiment, the conversion operations include retrieving, from the source table $164_1$, the rows to be compared. The retrieved rows may be compressed into a reduced row format (RRF). The compressed rows include the key columns and row checksums of the retrieved rows. The conversion operations include determining the collating sequence used by the source database $160_1$. To this end, the application 150 may selecting a character encoding scheme (such as ASCII) and insert all characters defined by the selected character encoding scheme into a temporary table in the source database $160_1$. The application 150 may then generate a query to retrieve the inserted characters, the query including an ORDER BY clause on the inserted characters. Results retrieved from the query may be used as a lookup array, where each character is used as an index to a corresponding numeric value specified by the character encoding scheme in effect at the source database $160_1$. These operations may also be repeated for the target database $160_2$.

In one embodiment, the lookup arrays may then be used to determine whether the collating sequences are different between the databases 160. When the collating sequences differ, the application 150 compares keys in rows retrieved from the databases in a character-by-character manner. Specifically, for each two characters to be compared, the application 150 does not directly compare the two characters. To be clear, the two characters to be compared include a first character from the source table 164₁ and a second character from the target table 164₂. Rather than comparing the two characters directly, the application 150 instead retrieves a code point for the first character from the lookup array in the target table 164₂. The application 150 then retrieves a code point for the second character from the lookup array in the target table 164₂. The application 150 then compares the retrieved code points to determine if the two characters match. In other embodiments, rather than the lookup array in the target table 164₂ to retrieve a code point for the first character, the application 150 may use the lookup array in the source table 164₁ to retrieve a code point for the second character. To compare each retrieved row, the application 150 may calculate a row checksum over non-key columns of the row and use a binary search to look up the key in the compressed rows that are stored in RRF format. If a matching key is found, then the row checksums are compared. The application 150 may record all differences identified into the difference reporting queue. The identified differences may be recorded by storing the associated keys and proposed actions into the difference reporting queue.

Figure 3:
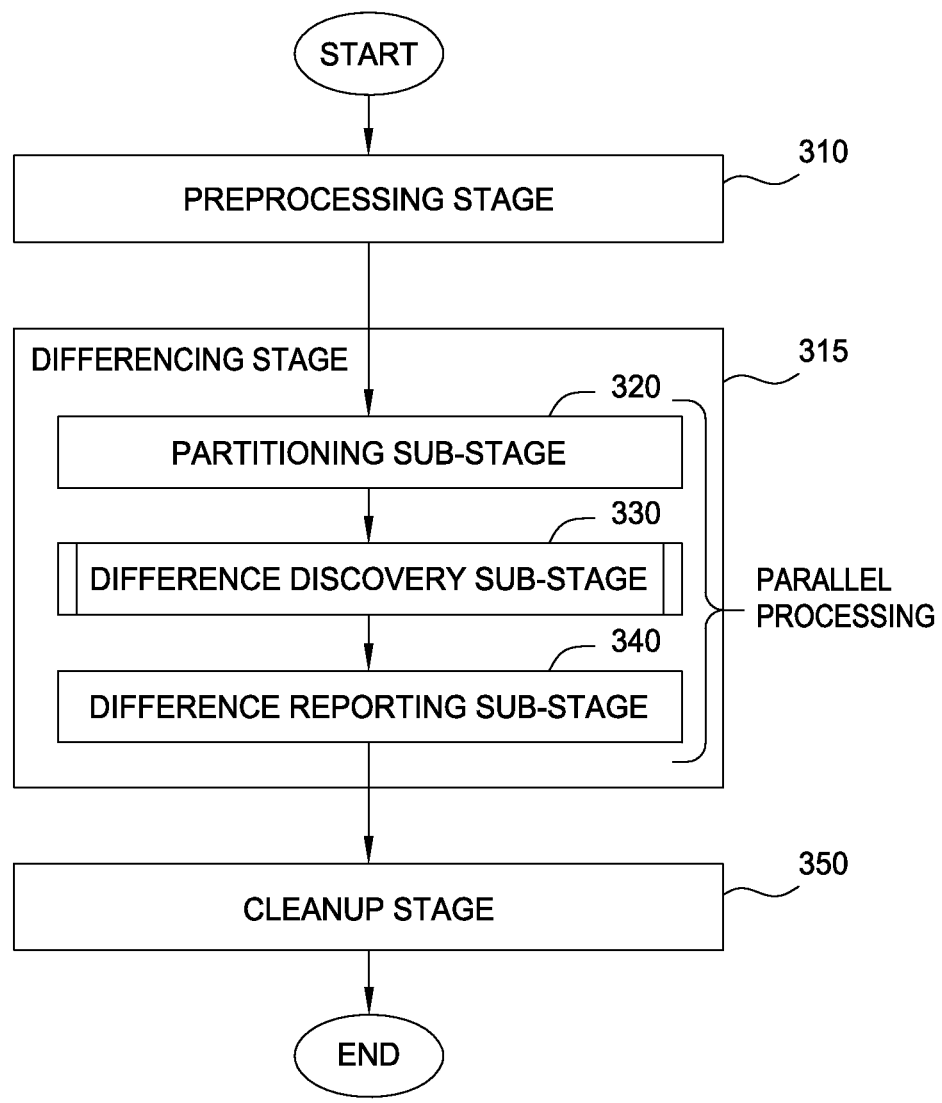
FIG. 3 is a flowchart depicting a method for determining whether two tables are consistent with each other, according to one embodiment of the invention.

FIG. 3 is a flowchart depicting a method 300 for determining whether two tables are consistent, according to one embodiment of the invention. The method 300 is expressed in the form of the stages discussed above. The method 300 begins at step 310, where the application 150 enters the preprocessing stage. In the preprocessing stage, the application 150 verifies whether a set of predetermined conditions is met. At step 315, the application 150 enters the differencing stage. In the differencing stage, the application 150 evaluates the two tables to determine whether the two tables are consistent with each other. The differencing stage 315 includes three sub-stages which may be executed in parallel. The three sub-stages include a partitioning sub-stage (step 320), in which the application 150 partitions the tables to be compared. The three sub-stages also include a difference discovery sub-stage (step 330), in which the application 150 identifies differences between the tables by comparing results obtained from invoking stored procedures in the databases. The step 330 is further described below in conjunction with FIG. 4. The three sub-stages also include a difference reporting sub-stage (step 340), in which the application 150 records each difference identified, along with a proposed action for resolving the respective difference. At step 350, the application 150 enters the cleanup stage 350 to drop, from the databases, any temporary tables used in previous stages. After the step 350, the method 300 terminates.

Figure 4:
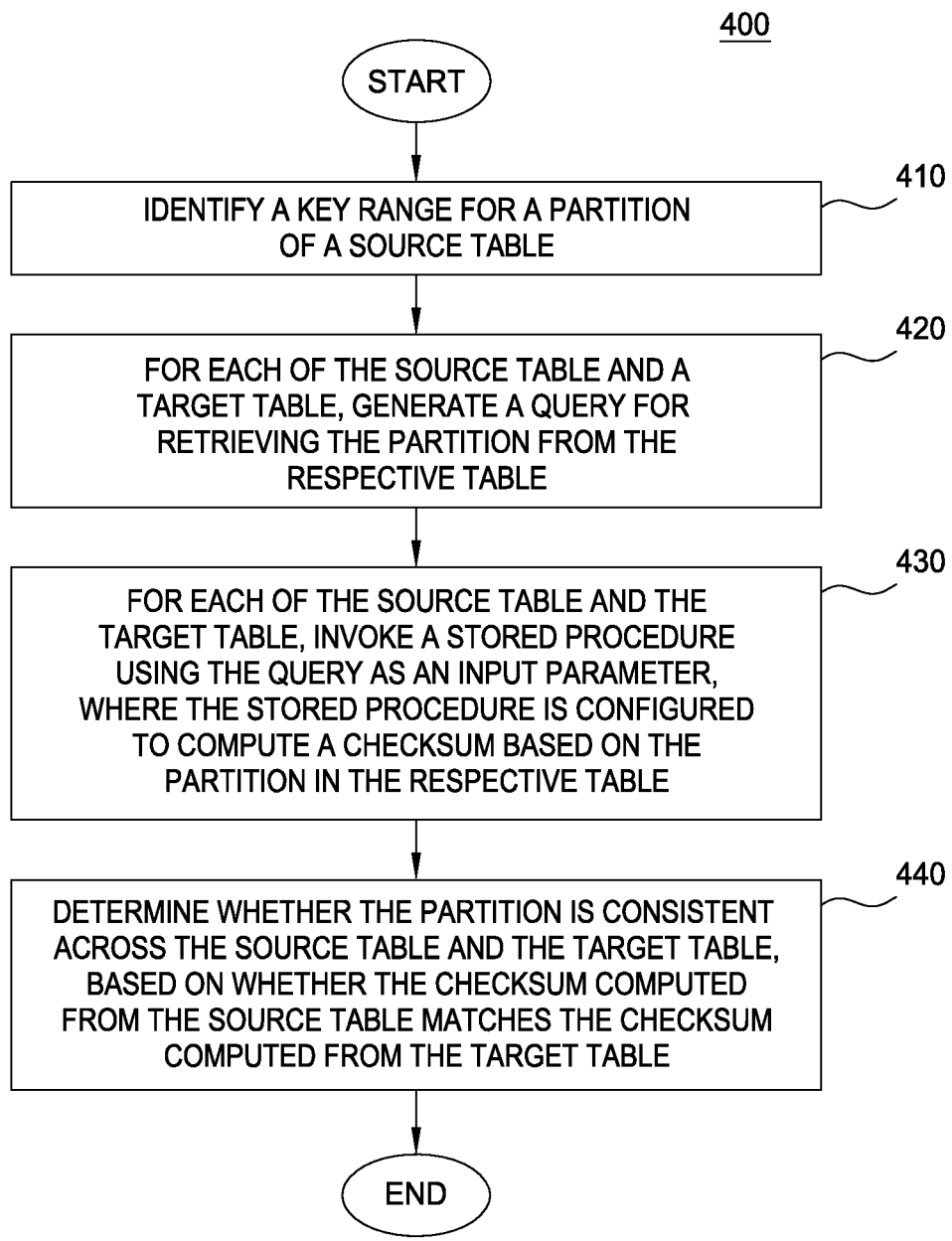
FIG. 4 is a flowchart depicting a method for identifying differences between two tables, according to one embodiment of the invention.

FIG. 4 is a flowchart depicting a method 400 for identifying differences between two tables, according to one embodiment of the invention. The method 400 corresponds to the step 330 of FIG. 3. As shown, the method 400 begins at step 410, where the application 150 identifies a key range for a partition of the source table. At step 420, for each of the source table and the target table, the application 150 generates a query for retrieving the partition from the respective table. At step 430, for each table, the application 150 invokes a stored procedure using the query as an input parameter. The stored procedure is configured to compute a checksum based on the partition in the respective table. At step 440, the application 150 determines whether the partition is consistent across the source table and the target table, based on whether the checksum computed from the source table matches the checksum computed from the target table. If the checksums do not match, the application 150 may identify inconsistent rows by retrieving and comparing row checksums and key values. At least in some embodiments, the steps 410 through 430 may be repeated until all partitions have been compared. After the step 440, the method 400 terminates.

Advantageously, embodiments of the invention provide techniques for comparing database tables. One embodiment provides an application configured to compare the database tables by partitioning the database tables, generating queries for retrieving each partition, and invoking a stored procedure using the generated queries as an input parameter. The stored procedure is configured to generate a checksum based on the respective partition. The application compares the checksums to determine if the partitions and/or tables are consistent. Advantageously, the techniques disclosed herein may be used to compare database tables more conveniently, efficiently, and/or scalably at least in some cases, especially for large table sizes and/or geographically distant databases.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce an amount of network traffic incurred in comparing database tables replicated across a network, the database tables including a first database table and a second database table, the computer-implemented method comprising:
   identifying at least one key range, each key range of which pertains to a first target partition of a respective one of the first database table and the second database table;
   generating, based on the identified at least one key range and for each the first and second database tables, a respective database query configured to retrieve the first target partition from the respective database table;
   invoking, for each database table, a respective stored procedure stored in the respective database table's database, using the respective database query generated for the respective database table as an input parameter to the respective stored procedure, wherein the respective stored procedure is configured to compute a respective first target partition checksum based on locally accessing the first target partition in the respective database table, wherein the stored procedure for the first database table and the stored procedure for the second database table are remotely invoked; and
   programmatically determining, by operation of one or more computer processors, whether the first target partition is consistent across the first and second database tables, based on a comparison between the first target partition checksums computed from the first and second database tables, respectively, and without requiring any data in the first target partition to be transmitted across the network.

2. The computer-implemented method of claim 1, wherein the first database table is stored in a first database, wherein the second database table is stored in a second database operatively connected to the first database via the network;
   wherein whether the first target partition is consistent across the first and second database tables is determined without requiring any data in the first target partition in the first database table to be transmitted across the network and without requiring any data in the first target partition in the second database table to be transmitted across the network.

3. The computer-implemented method of claim 2, wherein the database tables are replicated across the network, wherein each of the first database table and the second database table comprises a plurality of partitions;
  wherein the identifying, generating, invoking, and determining steps are repeated for each partition in the plurality of partitions and using a distinct key range specific to the respective partition, in order to determine whether data stored in the respective partition is consistently across the first and second database tables, thereby determining whether the database tables are consistently replicated across the network.

4. The computer-implemented method of claim 3, wherein each of the stored procedure for the first database table and the stored procedure for the second database table is remotely invoked by an application configured to determine whether the first target partition is consistent across the first and second database tables, wherein the application is operatively connected to a respective database management system (DBMS) configured to manage each database, wherein the application is configured to:
  determine that the first target partition is consistent across the first and second database tables upon determining that the first target partition checksum from the first database table matches the first target partition checksum from the second database table; and
  determine that the first target partition is not consistent across the first and second database tables upon determining that the first target partition checksum from the first database table does not match the first target partition checksum from the second database table.

5. The computer-implemented method of claim 4, wherein the amount of network traffic incurred in comparing the database tables replicated across the network is reduced by virtue of checksum generation logic being implemented in the stored procedures rather than in the application, wherein the plurality of partitions include at least three partitions, wherein the application is configured to:
  determine that the database tables are consistently replicated across the network upon determining a partition checksum match for each partition between the first and second database tables; and
  determine that the database tables are not consistently replicated across the network upon determining a partition checksum mismatch for at least one partition between the first and second database tables.

6. The computer-implemented method of claim 5, wherein the application includes a pool of threads comprising: (i) a main thread, (ii) a partitioner thread; (iii) a reporter thread; (iv) at least two worker threads for each partition; and (v) at least one merger thread for each partition; (vi) a plurality of cleaner threads; and (vii) a plurality of validator threads;
  wherein the application is configured to determine whether the database tables are consistently replicated via a plurality of stages of processing including a preprocessing stage, a differencing stage, and a cleanup stage;
  wherein the preprocessing stage includes verifying, by the main thread and the validator threads, whether the database tables satisfy a plurality of preconditions;
  wherein the differencing stage includes partitioning the database tables and identifying differences therein, the differencing stage comprising a plurality of sub-stages including a partitioning sub-stage, a discovery sub-stage, and a reporting sub-stage;
  wherein the cleanup stage includes deleting, by the cleaner threads and from each of the database tables, one or more temporary tables associated with the worker threads;
  wherein the partitioning sub-stage includes generating the plurality of partitions, wherein the discovery sub-stage includes identifying differences between the database tables, wherein the reporting sub-stage includes performing a predefined action based on the identified differences between the database tables.

7. The computer-implemented method of claim 6, wherein the partitioner thread is configured to, for each partition:
  determine a respective pair of boundary key values defining a key range of the respective partition, the pair of boundary key values including a minimum key value and a maximum key value; and
  generate, based on the respective pair of boundary key values, a respective database query to retrieve the respective partition, wherein each database query is stored in a partitioning queue for use in the discovery sub-stage;
  wherein the at least two worker threads include: (i) a first worker thread configured to invoke the stored procedure for the first database table and (ii) a second worker thread configured to invoke the stored procedure for the second database table;
wherein each worker thread receives, from the merger thread for the given partition, the database query generated for the respective database table.

8. The computer-implemented method of claim 7, wherein multiple target partitions of the first and second database tables are compared in parallel by virtue of the pool of threads included in the application, wherein the respective stored procedure for each database table is configured to, for a given partition in the respective database table:
  compute a plurality of row checksums including a respective row checksum for each of a plurality of rows in the given partition of the respective database table; and
  compute a partition checksum for the given partition, based on the plurality of row checksums for the given partition of the respective database table.

9. The computer-implemented method of claim 8, wherein the computer-implemented method in a first instance is performed using a first key range identified based on performing an index scan of the at least one of the first and second database tables without extracting any catalog entry, wherein the computer-implemented method in a second instance is performed using a second key range identified based on extracting a catalog entry of the at least one of the first and second database tables without performing any index scan;
  wherein each key range applies to each of the database tables, such that the pair of boundary key values, determined for a given partition of the first database table, need not be determined for the second database table.

10. The computer-implemented method of claim 9, wherein the application is further configured to:
  upon determining that the database tables are consistently replicated across the network, output an indication that the database tables are consistently replicated across the network;
  upon determining that the database tables are not consistently replicated across the network:
    upon identifying a user preference to automatically synchronize the database tables, synchronize the database tables by issuing a plurality of database commands retrieved from a differencing table, the plurality of database commands including at least one insert command, at least one update command, and at least one delete command; and upon identifying a user preference not to automatically synchronize the database tables, output an indication that the database tables are not consistently replicated across the network, wherein the database tables are not synchronized.

11. The computer-implemented method of claim 1, wherein the computer-implemented method is performed responsive to a request to compare the first and second database tables, wherein each of the stored procedure for the first database table and the stored procedure for the second database table is remotely invoked by an application configured to determine whether the first target partition is consistent across the first and second database tables;

wherein whether the database tables satisfy a plurality of preconditions is verified, wherein the plurality of preconditions include: (i) a first precondition specifying that the database tables have compatible column data types and column sizes, that do not necessarily need to be identical; (ii) a second precondition specifying that the database tables have identical character encoding schemes, collating sequences, and endianness; and (iii) a third precondition specifying that the database tables use identical constraints configured to enforce uniqueness of each value in a specified key;

wherein the application is configured to handle each of five different incident types in terms of determining whether the first target partition is still consistent across the first and second database tables after the respective incident type occurs, the five different incident types including: (i) an error in replication; (ii) modification by an external application; (iii) inadvertent modification due to an error in the external application; (iv) intentional user modification; and (v) inadvertent user modification.

12. The computer-implemented method of claim 11, wherein the application is further configured to perform type casting to convert between data types and sizes between the database tables, in an instance where replication of the database tables supports schema mapping and where the types and sizes between the database tables are not identical but are compatible, wherein the application is further configured to:

upon determining that the plurality of preconditions is satisfied, determine partition criteria with which to partition the database tables, the partition criteria including a partition size and a partition count;

wherein the partition size is determined, in respective instances, based on each input selected from an amount of available memory and a user-specified partition size, wherein the partition count is determined as a predefined function of: (i) the partition size, (ii) a row size, and (iii) a total row count; wherein the row size is a minimum selected from row sizes of the first and second database tables, respectively.

13. The computer-implemented method of claim 1, wherein each of the stored procedure for the first database table and the stored procedure for the second database table is remotely invoked by an application configured to determine whether the first target partition is consistent across the first and second database tables, wherein the application is further configured to:

determine a count of threads to spawn, as a predefined function of: (i) the partition count and (ii) a predefined maximum thread count; the predefined function comprising a minimum selected from the partition count and a predefined maximum thread count, wherein a plurality of merger threads equal in count to the determined count of threads is spawned by the application during the partitioning sub-stage, the plurality of merger threads including the at least one merger thread for each partition;

where each merger thread is configured to:
spawn at least two worker threads;
remove, from the partitioning queue, a next query; and
assign the next query to the at least two worker threads via a partitioning statement queue associated with the respective merger thread;

wherein each worker thread is configured to pass the next query as the input parameter in invoking the respective stored procedure.

14. The computer-implemented method of claim 13, wherein the first database table is stored in a first database, wherein the second database table is stored in a second database operatively connected to the first database via the network, wherein the application is further configured to:

generate, for each of the first and second database tables, a respective plurality of partitions of the respective database table, independent of any existing partition in the first and second database tables, wherein each plurality of partitions is in count equal to the partition count;

wherein in a given instance, the respective plurality of partitions of the respective database table is not stored in the first database and is not stored in the second database, but rather, partition information is generated and resident in memory of the application;

wherein the stored procedure is configured to, for the given partition:
retrieve all rows of the given partition using multi-row fetches based on the next query;
compute the plurality of row checksums based on the retrieved rows;
recursively compute the partition checksum for the given partition, based on the plurality of row checksums and based further on, in respective instances, each of a set of distinct, predefined check aggregation functions.

15. The computer-implemented method of claim 1, wherein each of the stored procedure for the first database table and the stored procedure for the second database table is remotely invoked by an application configured to determine whether the first target partition is consistent across the first and second database tables;

wherein a plurality of merger threads equal in count to the determined count of threads is spawned by the application, the plurality of merger threads including the at least one merger thread for each partition, wherein each merger thread is configured to, upon determining a partition checksum mismatch, queue a merge request to at least two worker threads associated with the respective merger thread;

wherein each worker thread is further configured to, responsive to the merge request:
fetch a respective result set comprising keys and corresponding row checksums from a temporary table associated with the respective worker thread; and
pass the respective result set to the merger thread via one or more checksum queues, wherein the keys and corresponding row checksums are sorted by key order;

wherein each merger thread is further configured to:
  join the respective result sets received from the worker threads in order to identify row-by-row differences; and
  send each identified difference to the reporter thread via a difference reporting queue associated with the reporter thread, wherein the discovery sub-stage is complete upon identification of all differences.

16. The computer-implemented method of claim 15, wherein in a first instance, the application determines whether the database tables are consistently replicated by opening a cursor with an uncommitted read isolation level, in order to reduce impact to one or more other applications accessing the database tables, in which case the differences identified by the application do not necessarily reflect one or more latest modifications to the database tables by the one or more other applications;
  wherein in a second instance in which application suspension is acceptable, the one or more applications accessing the database tables are suspended prior to the application determining whether the database tables are consistently replicated, in which case the differences identified by the application reflect all modifications to the database tables by the one or more other applications, wherein in the second instance in which application suspension is acceptable, both of the database tables are configured to accept updates, and all in-flight transactions are first allowed to complete prior to the application determining whether the database tables are consistently replicated.

17. The computer-implemented method of claim 1, wherein each of the stored procedure for the first database table and the stored procedure for the second database table is remotely invoked by an application configured to determine whether the first target partition is consistent across the first and second database tables;
  wherein in a first instance in which application suspension is unacceptable, the application is configured to limit a range of rows to compare based on a last modified timestamp criterion that is user-specified;
  wherein in a second instance in which application suspension is unacceptable and in which the database tables do not include any timestamp column, the application is configured to perform two consecutive consistency determinations and compare results thereof to identify a set of differences, the two consecutive consistency determinations separated in time by at least a replication latency window in an event that replicated updates are suspected to be occurring, wherein the set of differences exclude: (i) any false positive resulting from the replicated updates and (ii) any false negative resulting from the replicated updates.

18. The computer-implemented method of claim 17, wherein the application is further configured to, upon determining that the database tables do not satisfy a plurality of preconditions, perform a predefined conversion operation on the database tables in order to satisfy the plurality of preconditions, wherein the predefined conversion operation comprises:
  retrieving, from the first database table, a plurality of rows to be compared;
  compressing the retrieved plurality of rows into a reduced row format, wherein the compressed rows include key columns and corresponding row checksums of the retrieved plurality of rows;
  for each of the first and second databases:
    determining a collating sequence used by the respective database;
    inserting all characters defined by a selected character encoding scheme into a temporary table in the respective database;
    generating a query to retrieve the inserted characters in sorted fashion, wherein the retrieved characters serve as a respective lookup array such that each character is an index to a corresponding numeric value specified by the character encoding scheme of the respective database; and
  upon determining, based on the respective lookup arrays, that the collating sequences are different between the first and second database tables, comparing keys in rows retrieved from the database tables, in character-by-character fashion and based on respective code points retrieved from the respective lookup arrays, wherein a respective row checksum is computed in order to compute each row, the respective row checksum computed based only on non-key columns of the respective row.

19. A computer program product to reduce an amount of network traffic incurred in comparing database tables replicated across a network, the database tables including a first database table and a second database table, the computer program product comprising:
  a non-transitory computer-readable medium having computer-readable program code embodied therewith, the computer-readable program code executable by one or more computer processors to:
    identify at least one key range, each key range of which pertains to a first target partition of a respective one of the first database table and the second database table;
    generate, based on the identified at least one key range and for each the first and second database tables, a respective database query configured to retrieve the first target partition from the respective database table;
    invoke, for each database table, a respective stored procedure stored in the respective database table's database, using the respective database query generated for the respective database table as an input parameter to the respective stored procedure, wherein the respective stored procedure is configured to compute a respective first target partition checksum based on locally accessing the first target partition in the respective database table, wherein the stored procedure for the first database table and the stored procedure for the second database table are remotely invoked; and
    programmatically determine whether the first target partition is consistent across the first and second database tables, based on a comparison between the first target partition checksums computed from the first and second database tables, respectively, and without requiring any data in the first target partition to be transmitted across the network.

20. A computer-implemented method to reduce an amount of network traffic incurred in comparing database tables replicated across a network, the database tables including a first database table and a second database table, the computer-implemented method comprising:
  receiving a request to compare the first and second database tables, wherein the request is received by an application having a merger thread for each of a plurality of target partitions of the first and second database tables, at least two worker threads for the respective target partition, and a reporter thread;

responsive to receiving the request, performing a conversion operation in order to render the first and second database tables compatible in terms of at least three of: (i) column data types and column sizes; (ii) character encoding schemes; (iii) collating sequences; (iv) endianness; and (v) key constraints;

identifying at least one key range, each key range of which pertains to a first target partition of a respective one of the first and second database tables;

generating, based on the identified at least one key range and for each of the first and second database tables, a respective database query configured to retrieve the first target partition from the respective database table, wherein the respective database query is sent by the merger thread for the first target partition to the at least two worker threads for the first target partition;

remotely invoking, for each database tables and by each of the at least two worker threads for the first target partition, a respective stored procedure stored in the respective database table's database, using the respective database query generated for the respective database table as an input parameter to the respective stored procedure, wherein the respective stored procedure is configured to compute a respective first target partition checksum based on locally accessing the first target partition in the respective database table;

upon identifying a partition checksum mismatch by the merger thread for the first target partition, obtaining, by the merger thread for the first target partition and from each of the at least two worker threads for the first target partition, a respective result set including keys and row checksums associated with the partition checksum mismatch; and joining the respective result sets by the merger thread for the first target partition and by operation of one or more computer processors, in order to identify one or more row-by-row differences, wherein each identified row-by-row difference is sent to the reporter thread for output, thereby reducing an amount of network traffic incurred in comparing the first and second database tables replicated across the network.

* * * * *